Patented Oct. 16, 1928.

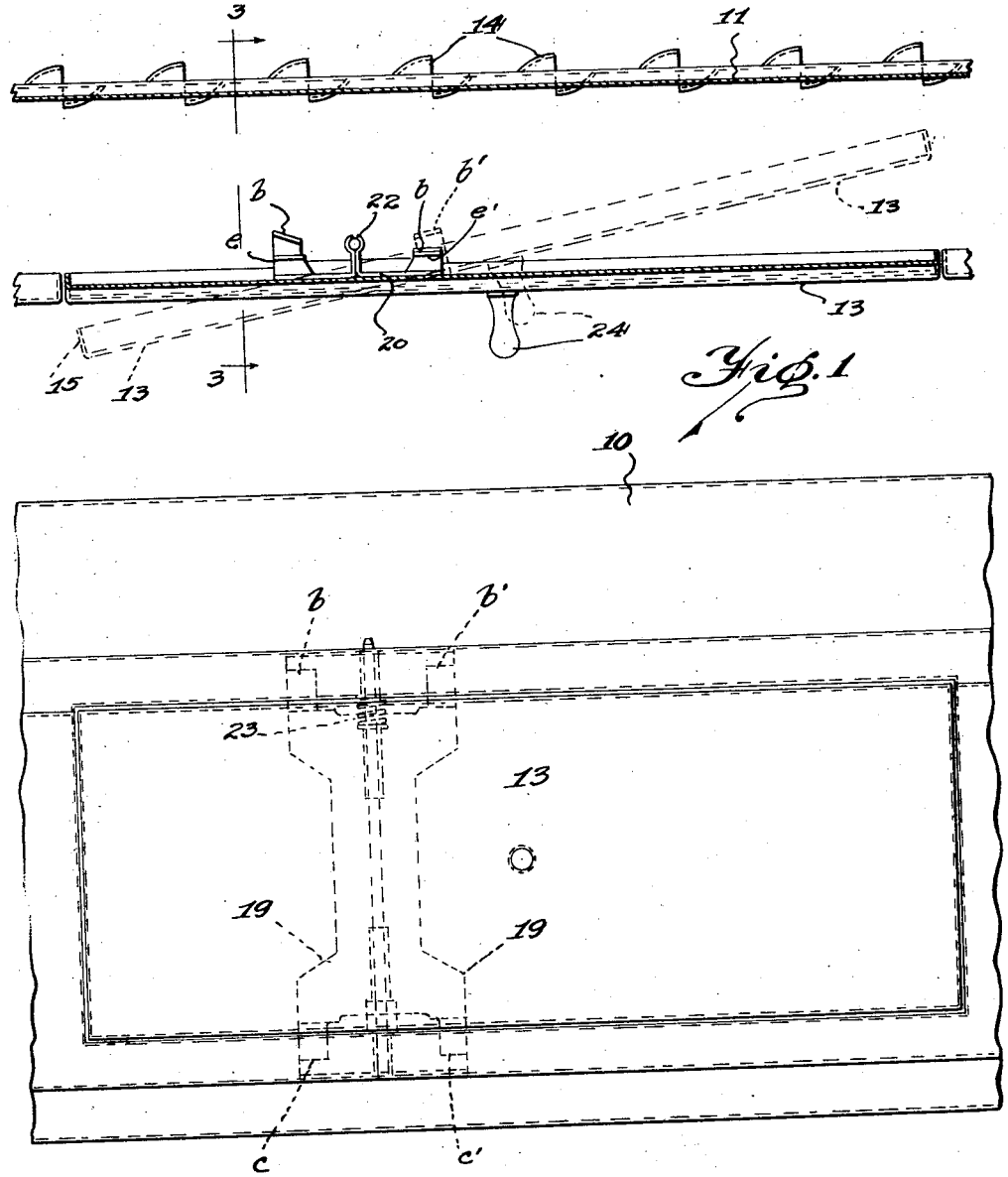

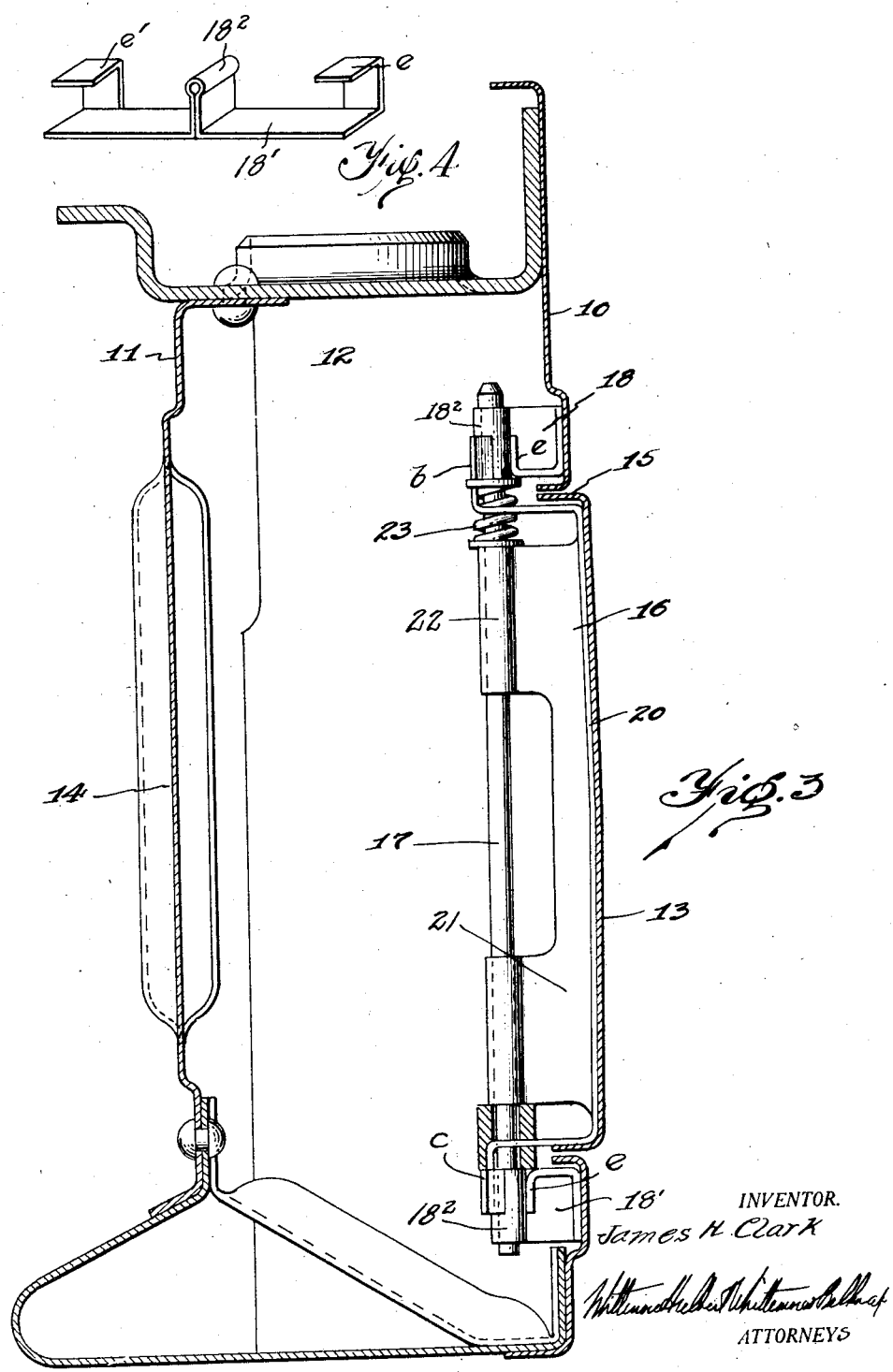

1,688,069

UNITED STATES PATENT OFFICE.

JAMES H. CLARK, OF DETROIT, MICHIGAN, ASSIGNOR TO BRIGGS MANUFACTURING COMPANY, OF DETROIT, MICHIGAN, A CORPORATION OF MICHIGAN.

VENTILATOR.

Application filed June 14, 1926. Serial No. 115,982.

This invention relates generally to ventilators and particularly to the type used on motor buses.

An object of the invention is to provide a ventilator shutter of this type that is mounted in a side wall of the motor bus preferably adjacent to the top thereof so that it can be easily manipulated and adjusted to a number of different positions for controlling the passage of air to and from the bus.

Another object is to provide simple and effective means for holding the shutter in various positions of adjustment and for preventing the movable parts from rattling.

In the accompanying drawings:

Figure 1 is a top plan view of the ventilator;

Figure 2 is a side elevation thereof;

Figure 3 is a vertical sectional view taken on the line 3—3 of Figure 1;

Figure 4 is a detail view of one of the brackets carried by the inner wall.

In the present invention 10 represents the inside upper wall of a motor bus, and 11 designates the outside wall. As shown, these walls are spaced apart throughout the length of the bus so that a longitudinal air passage 12 is provided at each side of the bus.

At intervals along the inside wall are positioned suitable openings in which ventilator shutters 13 are mounted, while in the outer wall suitable louvers 14 are formed at points opposite the shutters.

With reference to the particular construction of the ventilator shutters, each one is of dished formation, having a lateral peripheral flange 15. Each shutter is preferably carried by a bracket 16 that is rigidly connected to a pintle 17 journaled in suitable bearing brackets 18, 18′ on the inner panel or wall.

As shown, the bracket 16 is preferably formed of two sheet metal stampings 19 that are welded together. Each stamping has a flat base portion 20 that is preferably secured by a welding operation to the base of the shutter and is provided at the inner end thereof with a lateral flange 21 having the arcuate bearing portion 22. The corner extremities of the bracket 16 are extended at right angles to the base members to form two pairs of upper and lower L-shaped lugs $b$, $b'$, $c$, $c'$.

As shown in Figure 3, the bearing brackets 18 and 18′ for the pintle 17 are mounted upon the inner wall 10 above and below the openings in which the ventilator shutters operate. The brackets are preferably formed of single pieces of pressed steel provided intermediate of their ends with the bearing portions $18^2$ and having at their outer extremities L-shaped lugs $e$, $e$ and $e'$, $e'$, which constitute fixed stops cooperating with the movable lugs $b$, $c$, and $b'$ and $c'$ of the ventilator shutter.

As more clearly shown in Figure 1, these stops are alternately engaged by the lugs when the shutter is moved to open or closed positions, therefore the stops limit the movement of the shutter within a given radius.

To provide an efficient construction, a compressed coil spring 23 is interposed upon the pintle at its upper end between the lower portion of the bearing bracket 18 and the upper end of the two-part bracket 16. If desired, anchorage apertures may be formed in the brackets to receive the opposite ends of the spring.

Thus it is apparent that this spring will effectively prevent any rattling of the shutter, and because of the pressure exerted, there is sufficient frictional engagement between the brackets, so that the shutter may be held in any adjusted position within the limit of its swing. Any suitable means, such as a handle 24 attached to the shutter, may be used as operating means.

Referring to Figure 1, the ventilator shutter is shown in full lines in closed position wherein the fixed lug $e'$ is in engagement with the movable lug $b'$ of the shutter and prevents any further inward movement of a shutter. In this position of the shutter the fixed lug $e$ which is located on the other side of the pivot point is separated from the movable lug $b$. However, when the shutter is moved to the dotted line position the lug $b$ will be separated from the fixed lug $e'$ and will move outwardly to the position indicated. The same movement of the shutter will cause the lug $b$ to move inwardly until it engages the fixed lug $e$ which prevents further travel of the shutter in this direction.

It will be apparent therefore, that the movable lugs $b$, $c$, $b'$, $c'$ alternately seat against the fixed lugs $e$, $e$ and $e'$, $e'$ and cooperate therewith to limit the movement of the shutter within a given radius, that is, between its open and closed position. Because of the spring 23 the shutter may be adjusted to various positions within the limit of its swing and held in such positions without any rattling between the parts.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. In a motor bus, a wall provided with an opening, a pintle journaled in bearings in said wall, a ventilator shutter carried by said pintle for controlling the passage of air through the bus, a bracket carried by said shutter, lugs mounted on the bracket, lugs carried by the said wall and cooperating with the lugs aforesaid, to limit the movement of the shutter between predetermined points.

2. In a motor bus, a wall provided with an opening, a ventilator shutter mounted to swing therein, a vertical pintle, a bracket rigidly connecting the shutter to the pintle, lugs arranged in pairs at the upper and lower ends of the said bracket, and means on the wall cooperating with the lugs aforesaid to limit the movement of the shutter between predetermined points.

3. In a motor bus, a wall provided with an opening, brackets mounted on said wall adjacent said opening, a pintle journalled in bearings on said brackets, a ventilator shutter carried by said pintle for controlling the passage of air through the bus, a bracket carried by said shutter, lugs mounted on the bracket, lugs mounted on the brackets located on said wall and cooperating with the lugs aforesaid to limit the movement of the shutter between predetermined points.

4. In a motor bus, a wall provided with an opening, a ventilator shutter pivotally mounted therein, lugs mounted on the said shutter upon opposite sides of the pivot point thereof and lugs carried by said wall and constituting stops alternately engageable with the aforesaid lugs for limiting the movement of the shutter between predetermined points.

5. In a motor bus, a wall provided with an opening, a ventilator shutter mounted to swing therein, a vertical pintle, a bracket rigidly connecting the pintle to the shutter, lugs arranged in pairs upon opposite sides of the pintle and lugs on the wall constituting stops for alternately engaging the aforesaid lugs to limit the movement of the shutter between predetermined points.

6. In a motor bus, a wall provided with an opening, brackets mounted on said wall adjacent said opening, a pintle journaled in bearings on said brackets, a ventilator shutter, a bracket rigidly connecting the pintle to the shutter and provided with spaced lugs on opposite sides of said pintle, and lugs on the aforesaid brackets cooperating with the lugs aforesaid for limiting the movement of the shutter between predetermined points.

7. In a motor bus, a wall provided with an opening, brackets mounted on said wall adjacent said opening, a pintle journaled in bearings on said brackets, a ventilator shutter, a bracket rigidly connecting the pintle to the shutter and provided with spaced L-shaped lugs on opposite sides of said pintle, and L-shaped lugs on the aforesaid brackets cooperating with the lugs aforesaid for limiting the movement of the shutter between predetermined points.

8. In a motor bus, a wall provided with an opening, a ventilator shutter pivotally mounted therein, a bracket connected to said shutter and provided with spaced lugs on opposite sides of the pivot point of the shutter, and spaced lugs carried by said wall and constituting stops alternately engageable with the aforesaid lugs for limiting the movement of the shutter between predetermined points.

9. In a motor bus, a wall provided with an opening, a ventilator shutter pivotally mounted therein, a bracket having a base portion secured to said shutter, said bracket being provided at opposite ends with lugs spaced laterally from said base portion, spaced lugs carried by said wall and constituting stops alternately engageable with the lugs on said bracket for limiting the movement of the shutter between predetermined points.

10. In a motor bus, a wall provided with an opening, brackets mounted on said wall adjacent said opening, a pintle journaled in bearings on said brackets, a ventilator shutter, a bracket rigidly connecting the pintle to the shutter and provided with spaced lugs on opposite sides of said pintle, lugs on the aforesaid brackets cooperating with the lugs aforesaid for limiting the movement of the shutter between predetermined points, and resilient means carried by said pintle and interposed between one of said first mentioned brackets and said second mentioned bracket for yieldably retaining the shutter in different positions of adjustment.

11. In a motor bus, a wall provided with an opening, a pintle journalled in bearings in said opening, means on the wall adjacent said opening constituting stops, a ventilator shutter for closing said opening, a bracket rigidly connecting the shutter to said pintle and provided with means engageable with the means on said wall for limiting the movement of the shutter between predetermined points, and a coil spring carried by said pintle between said bracket and one of said bearings and yieldably retaining the shutter in different positions of adjustment.

In testimony whereof I affix my signature.

JAMES H. CLARK.